(12) United States Patent
St. Laurent et al.

(10) Patent No.: US 8,570,566 B2
(45) Date of Patent: Oct. 29, 2013

(54) SYSTEM AND METHOD THAT PROVIDES USER INTERFACE ON MOBILE NETWORK TERMINAL FOR RELEASING PRINT JOBS BASED ON LOCATION INFORMATION

(75) Inventors: Michael St. Laurent, Baden (CA); Mark Onischke, Kitchener (CA); Michael Kuindersma, Conestoga (CA); Dharmesh Krishnammagaru, Kitchener (CA); Jonathon Stairs, Kitchener (CA); Ken Noreikis, Orland Park, IL (US)

(73) Assignee: PrinterOn Inc., Kitchener (CA)

(*) Notice: Subject to any disclaimer, the term of this patent is extended or adjusted under 35 U.S.C. 154(b) by 377 days.

(21) Appl. No.: 12/884,799

(22) Filed: Sep. 17, 2010

(65) Prior Publication Data

US 2012/0069386 A1 Mar. 22, 2012

(51) Int. Cl.
*G06F 3/12* (2006.01)
*H04N 1/00* (2006.01)
*H04N 1/024* (2006.01)
*H04H 20/71* (2008.01)
*H04M 11/00* (2006.01)
*H04M 11/04* (2006.01)

(52) U.S. Cl.
USPC ......... 358/1.15; 358/1.13; 358/440; 358/473; 455/3.01; 455/403; 455/404.2; 455/408

(58) Field of Classification Search
USPC ......... 358/1.15, 1.13, 1.6, 1.1, 501, 508, 402, 358/435, 440, 443, 476, 473, 488, 296; 455/560, 456.1, 457, 423, 67.11, 438, 455/422.1, 426.1, 435.1, 226.1, 404.2, 403, 455/408, 414.1, 415, 421, 3.01, 3.02, 3.03, 455/3.04, 3.05, 3.06; 342/464, 357.24, 342/357.22, 450, 451
See application file for complete search history.

(56) References Cited

U.S. PATENT DOCUMENTS

| | | | |
|---|---|---|---|
| 2004/0190049 A1* | 9/2004 | Itoh | 358/1.15 |
| 2005/0085241 A1* | 4/2005 | Bahl et al. | 455/456.1 |
| 2008/0193182 A1* | 8/2008 | Sasama | 399/405 |

* cited by examiner

*Primary Examiner* — Benny Tieu
*Assistant Examiner* — Ngon Nguyen
(74) *Attorney, Agent, or Firm* — Occhiuti Rohlicek & Tsao LLP

(57) ABSTRACT

A system and method that provides a user interface on a mobile network terminal for operation with a printer resource access system wherein the user interface is modified for releasing a print job from a nearby printer resource. Since printer resources may include any number of print job release mechanism each requiring different authentication information, the user interface must be modified appropriately. The mobile network terminal obtains location information from a location service, such as GPS or an internet based location service, and provides the location information to a printer directory service in a printer resource access system. The printer directory service then consults the database of printer resource information and provides connection and configuration information for printer resource located nearby the mobile network terminal. The mobile network terminal modifies its user interface to accept the appropriate type of authentication and configuration information specified by the printer directory service. The authentication information may then be provided over a secure network connection to the printer resource to release the print job.

15 Claims, 10 Drawing Sheets

SYSTEM AND METHOD THAT PROVIDES USER INTERFACE ON MOBILE NETWORK TERMINAL FOR RELEASING PRINT JOBS BASED ON LOCATION INFORMATION

FIELD

The present invention relates to a method and system for releasing print jobs based on location information. In particular, the present invention relates to a modifying a user interface of a mobile network terminal to prompt the user for the authentication information to release a print job from a nearby printer resource.

BACKGROUND

Local area networks are widely used as a mechanism for making available computer resources, such as file servers, scanners and printers, to a multitude of computer users. It is often desirable with such networks to restrict user access to the computer resources in order to manage data traffic over the network and to prevent unauthorized use of the resources. Typically, resource access is restricted by defining access control lists for each network resource. However, as the control lists can only be defined by the network administrator, it is often difficult to manage data traffic at the resource level.

Wide area networks, such as the Internet, have evolved as a mechanism for providing distributed computer resources without regard to physical geography. The Internet Print Protocol ("IPP") emerged as a mechanism to control access to printing resources over the Internet. However, IPP was replete with deficiencies particularly with respect to administration of a large number of network resources to a large user base. For example, the ability to restrict access to firewall protected network resources is compromised when firewall access ports remain open for extended periods of time, i.e. are open and waiting for network traffic to access them. For example, access to IPP printers cannot be obtained without the resource administrator locating the resource outside the enterprise firewall, or without opening an access port through the enterprise firewall. Whereas the latter solution provides the resource administrator with the limited ability to restrict resource access, the necessity of keeping open an access port in the enterprise firewall exposes the enterprise network to the possibility of security breaches.

Network resource access systems were developed that provide a central mechanism that simplified access to network resources such as printers. The network resource access system typically included a central or distributed database for storing information about the printer resources that assisted users in finding and using the desired network resource. Often these systems would rely on a name or logical location information that a user of the system would use to select or locate the physical location of the network resource.

User's of a network resource access system may submit a print job to a general location that may be served by multiple printer resources or to a specific printer resource. Each printer resource may include any number of different release mechanism that allow a user to release a print job. In addition each release mechanism may require different authentication information that is used to release a user's print job. How a print job is released may also depend on how the print job is submitted to the network resource access system and what information was provide along with the print job. Therefore, releasing a print job can be a difficult user task since the user may encounter any number of different release mechanisms that require different authentication information.

SUMMARY

Accordingly, there is provided a system and method that provides a user interface on a mobile network terminal that is modified for releasing a print job from a nearby printer resource.

According to a first aspect, there is provided a method for releasing a print job from a printer resource in proximity to a mobile network terminal. The method comprises obtaining location information of the mobile network terminal through a location service, providing location information to a printer directory service, receiving connection and configuration information for the printer resource, and modifying a user interface of the mobile network terminal to accept authentication information required to release the print job from the printer resource. In some aspects the method further comprises providing authentication information to the printer resource. In other aspects, modifying the user interface involves modifying the user interface to accept a certain type of authentication information that may correspond to a certain release mechanism accepted by the printer resource. In another aspect, there is provided a mobile network terminal comprising a network interface, a memory and a processor is configured to carry out the steps of the above method.

In another aspect, there is provided a method of releasing a print job from a printer resource. The method comprises receiving location information, querying a database of printer resource information to identify one or more printer resources near a location corresponding to the location information, providing connection and configuration information from the database for the one or more printer resources, receiving authentication information associated with the print job, and releasing the print job if the authentication information is verified. In another aspect, there is provided a system for releasing a print job from a printer resource comprising a database of printer resource information and one or more servers with a processor and memory that are configured to carry out the steps of the aforementioned method.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

Figure 1:
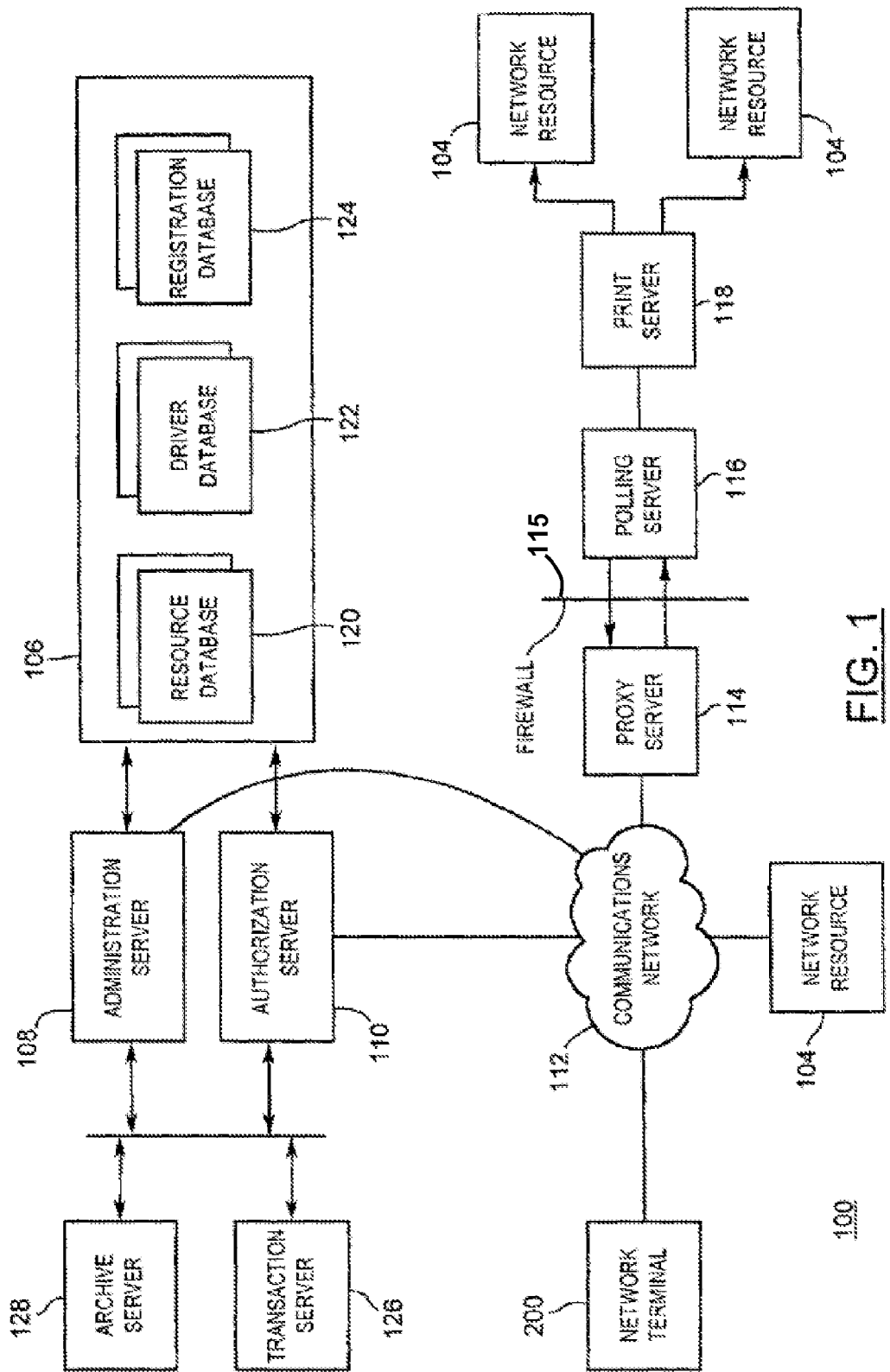
FIG. 1 is a schematic view of the network resource access system, according to the present invention, showing the network terminals, the network resources, the resource registry, the authorization server, the administration server, the proxy server, and the polling server.

Turning to FIG. 1, a network resource access system, denoted generally as 100, is shown comprising network terminals 200, network resources 104, a resource registry 106, an administration server 108, and an authorization server 110. Typically, the network resource access system 100 comprises a plurality of network terminals 200, and a plurality of network resources 104, however for enhanced clarity of discussion, FIG. 1 only shows a single network terminal 200 and a single network resource 104.

The network resource access system 100 also includes a communications network 112 facilitating communication between the network terminals 200, the network resources 104, the administration server 108, and the authorization server 110. Preferably, the communications network 112 comprises a wide area network such as the Internet, however the network 112 may also comprise one or more local area networks 112. Further, the network 112 need not be a land-based network, but instead may comprise a wireless network and/or a hybrid of a land-based network and a wireless network for enhanced communications flexibility.

Each network terminal 200 typically comprises a land-based network-enabled personal computer. However, the invention is not limited for use with personal computers. For instance, one or more of the network terminals 200 may comprise a wireless communications device, such as a wireless-enabled personal data assistant, or e-mail-enabled wireless telephone if the network 112 is configured to facilitate wireless data communication. In addition, the invention is not limited to only facilitating transmission of text data 221, but instead may be used to transmit image data, audio data or multimedia data, if desired.

Figure 2:
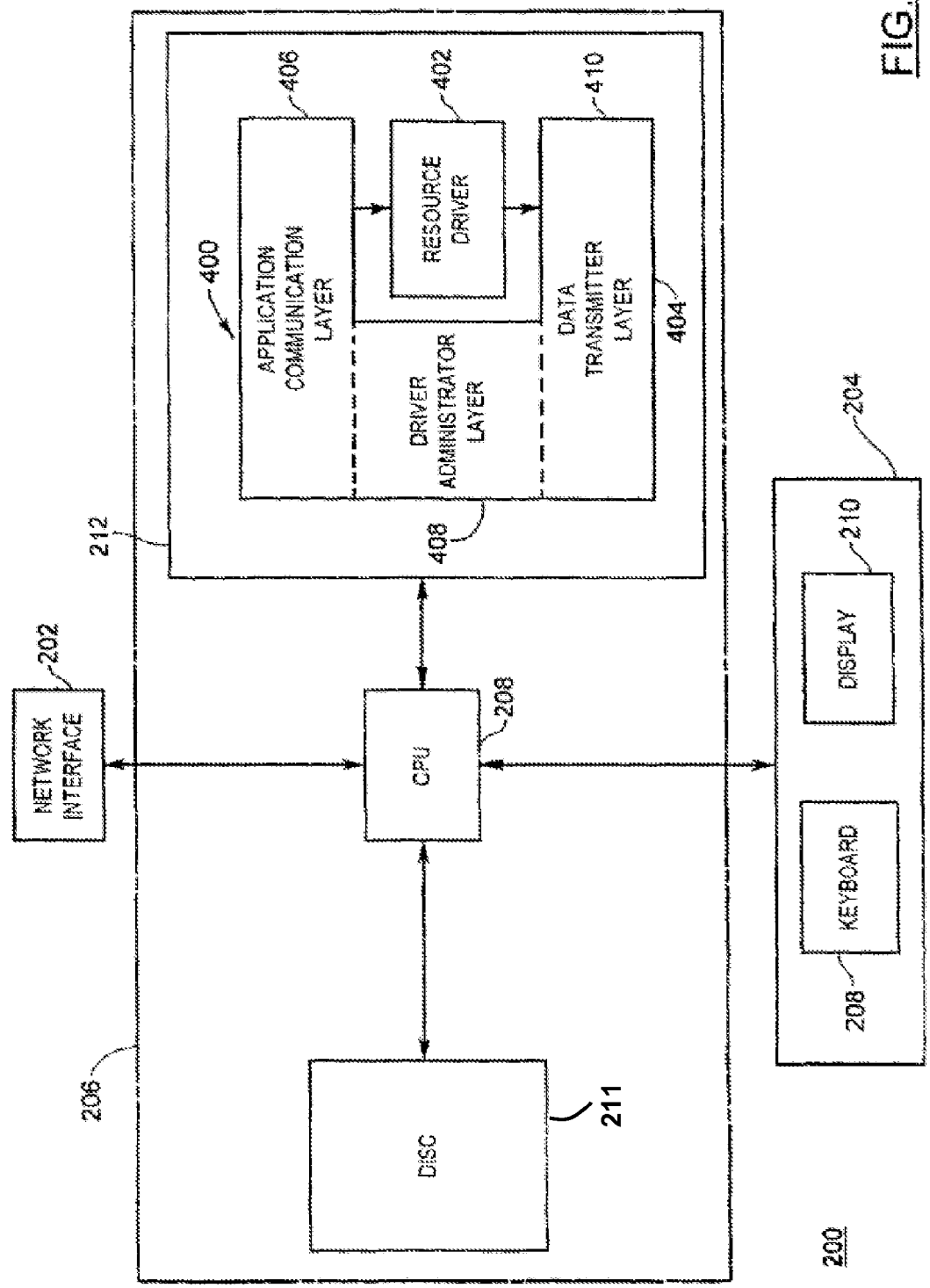
FIG. 2 is a schematic view one of the network terminals depicted in FIG. 1, showing the driver application for use with the present invention.

As shown in FIG. 2, the network terminal 200 comprises a network interface 202, a user interface 204, and a data processing system 206 in communication with the network interface 202 and the user interface 204. Typically, the network interface 202 comprises an Ethernet network circuit card, however the network interface 202 may also comprise an RF antenna for wireless communication over the communications network 112. Preferably, the user interface 204 comprises a data entry device 208 (such as keyboard, microphone, touch screen or writing tablet), and a display device 210 (such as a CRT or LCD display).

The data processing system 206 includes a central processing unit (CPU) 208, and a non-volatile memory storage device (DISC) 211 (such as a magnetic disc memory or electronic memory) and a read/write memory (RAM) 212 both in communication with the CPU 208. The DISC 211 includes data which, when loaded into the RAM 212, comprise processor instructions for the CPU 208 which define memory objects for allowing the network terminal 200 to communicate with the network resources 104 and the authorization server 110 over the communications network 112. The network terminal 200, and the processor instructions for the CPU 208 will be discussed in greater detail below.

Typically, each network resource 104 can comprise a printing device, and in particular, an IPP-compliant printer. However, the invention is not limited for use with networked printers (IPP-compliant or otherwise), but instead can be used to provide access to any of a variety of data communication devices, including facsimile machines, image servers and file servers. Further, the invention is not limited for use with land-based data communications devices, but instead can be used to provide access to wireless communications devices. For instance, the network resource access system 100 can be configured to facilitate data communication with e-mail pagers or e-mail enabled wireless telephones 200.

It is expected that some of the network resources 104 may be located behind an enterprise firewall 115. Accordingly, to facilitate communication between network terminals 200 and firewall-protected network resources 104, the network resource access system 100 may also include a proxy server 114 located logically outside the enterprise firewall 115, and a polling server 116 located logically within the firewall 115, as shown in FIG. 1. Preferably, the proxy server 114 is located on-site at the enterprise responsible for administering the network resource 104, is provided with a network address corresponding to the enterprise, and includes a queue or other memory storage device for receiving application data and control data. However, the proxy server 114 may also be located off-site, and may be integrated with the authorization server 110 if desired. This latter option can be advantageous since it allows system administrators to provide access to network resources 104, but without having to incur the expense of the domain name registration and server infrastructure.

In addition to the proxy server 114 and the polling server 116, the enterprise can include an enterprise/resource server 118 (e.g. a print server) to facilitate communication with the network resources 104 located behind the firewall 115 and the polling server 116. The polling server 116 is in communication with the enterprise server 118, and is configured to initiate periodic polling messages to the proxy server 114 through the firewall 115 to determine whether application data and/or control data from or otherwise associated with a network terminal 200 is waiting in the queue of the proxy server 114. The proxy server 114 is configured to transmit any stored/queued application data to the polling server 116 in response to the poll signal from the polling server 116, as well as any control data associated with the application data in response to a poll signal. Upon receipt of the stored application data from the proxy server 114, the polling server 116 can transmit the application data to the enterprise server 118 for distribution to the appropriate network resource 104, for example. This polling mechanism allows application data to be transmitted to network resources 104 located behind a firewall 115, but without exposing the enterprise to the significant possibility of security breaches associated with firewall 115 access ports that may be open.

Figure 3:
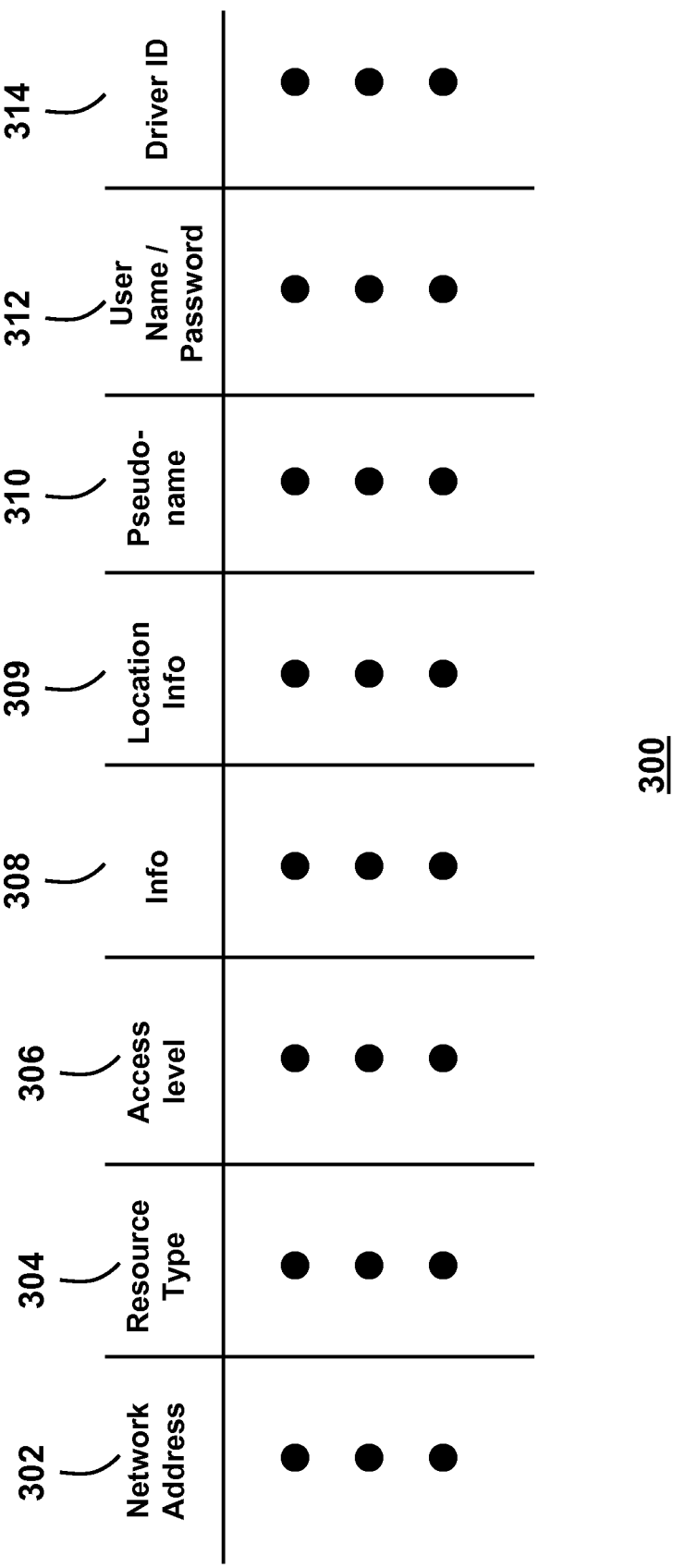
FIG. 3 is a schematic view of the format of the resource records comprising the resource database of the resource registry depicted in FIG. 1, showing the network address field, the resource type field, the user access level field, the resource information field, the pseudo-name field, the user-name/password field, and the driver identification field.

The resource registry 106 comprises a resource database 120, a driver database 222, and a user registration database 124. The resource database 120 includes resource records 300 identifying parameters associated with the network resources 104. As shown in FIG. 3, each resource record 300 comprises a network address field 302, a resource type field 304, and a user access level field 306 for the associated network resource 104. The network address field 302 identifies the network address of the network resource 104. As discussed above, a network resource 104 may comprise an IPP-compliant printer or other network connected printer, in which case the network address field 302 identifies the IP address to access the printer. For example, in the case where the network resource 104 comprises a non-IPP-compliant device and the communications network 112 comprises the Internet, preferably the network resource 104 is linked to the communications network 112 via a suitable server, and the network address field 302 for the network resource 104 identifies the IP address of the server.

The resource type field 304 identifies the type of data communication device of the network resource 104. For instance, the resource type field 304 may specify that the network resource 104 is a printer, an image server, a file server, an e-mail pager, or an e-mail enabled wireless telephone. Further, the resource type field 304 may include a resource type sub-field specifying a sub-class of the network resource type. For example, the resource type sub-field may specify that the network resource 104 is an IPP-capable printer, or a non-IPP-capable printer.

The user access level field 306 identifies the type of communications access which the network terminals 200 are allowed to have in regards to the associated network resource 104. In some embodiments, the user access level field 306 may establish that the network resource 104 allows one of: (a) "public access" in which any network terminal 200 of the network resource access system 100 can communicate with the network resource 104; (b) "private access" in which only members (e.g. employees) of the enterprise associated with the network resource 104 can communicate with the network resource 104; and (c) "authorized access" in which only particular network terminals 200 can communicate with the network resource 104. Other embodiments may incorporate other access schemes.

If the user access level field 306 specifies "authorized access" for a network resource 104, preferably the user access level field 306 includes a sub-field which lists the names of the network terminals 200 or users that are authorized to access the network resource 104, and a sub-field which includes an authorization password which the identified network terminals 200 must provide in order to access the network resource 104. Other embodiments may incorporate other systems to verify user credentials, such as, for example, an LDAP-based system in an enterprise environment. If the user access level field 306 specifies "private access" for a network resource 104, preferably the user access level field 306 includes a sub-field which lists the network address of the network terminals 200 or the user names which are deemed to members of the enterprise.

It should be understood, however, that the user access level field 306 is not limited to identifying only the foregoing predefined user access levels, but may instead identify more than one of the predefined user access levels, or other user access levels altogether. For instance, the user access level field 306 may identify that the associated network resource 104 allows both private access to all employees of the enterprise running the network resource 104, and authorized access to other pre-identified network terminals 200. Further, the user access level field 306 may also include one or more sub-fields (not shown) which provide additional restrictions/permissions on the type of communications access which the network terminals 200 are allowed to have in regards to the associated network resource 104. For instance, the user access level sub-fields may limit the hours of operation of the network resource 104, or may place restrictions on the type of access limitations on a per-user basis, or per-group basis. Other variations on the type of access will be readily apparent, and are intended to be encompassed by the scope of the present invention.

Preferably, each resource record 300 includes an information field 308 which provides information on the network resource 104, such as data handling capabilities, resource pricing. Each resource record 300 also preferably includes a location information field 309, such as, for example, geographical co-ordinates. This latter parameter is particularly advantageous for use with mobile network terminals 200, such as a wireless-enabled personal data assistant or an e-mail-enabled wireless telephone, since it allows the network terminal 200 to identify the nearest one of a plurality of available network resources 104. If the network resource is a printer resource, the information field 308 may also include information about how a print job may be released and the type of authentication information required to release the print job.

Each resource record 300 can also include a pseudo-name field 310, a username/password field 312 and a network driver identifier field 314. The pseudo-name field 310 contains a resource pseudo-name which identifies the network resource 104 to the network terminals 200. Preferably, the pseudo-name is a network alias that identifies the physical location and properties of the network resource 104, but does not identify the network address of the resource 104. Further, preferably each pseudo-name uniquely identifies one of the network resources 104, however a group of the network resources 104 may be defined with a common pseudo-name to allow communication with a group of network resources 104. This latter feature is particularly advantageous since it allows the administrator of an enterprise associated with the group of network resources to dynamically allocate each network resource 104 of the group as the demands for the network resources 104 or maintenance schedules require.

In addition, preferably the resource record 300 includes a plurality of the pseudo-name fields 310 to allow the administrator of the associated network resource 104 to update the name assigned to the network resource 104, while also retaining one or more previous pseudo-names assigned to the network resource 104. As will be explained, this feature is advantageous since it allows the administrator to update a resource name without the risk that network terminals 200 using a prior pseudo-name will be unable to locate or communicate with the network resource 104.

The username/password field 312 contains a unique username and password combination which allows the administrator of the associated network resource 104 to prevent authorized access and alteration to the data contained in the resource record 300. Preferably, each resource record 300 also includes an e-mail address field (not shown) which the network resource access system 100 uses to provide the administrator of the associated network resource 104 with a notification e-mail message when a message is successfully transmitted to the network resource 104.

The driver identifier field 314 contains a resource driver identifier which is used in conjunction with the driver database 122 to provide the network terminals 200 with the appropriate resource driver for communication with the network resource 104. The driver database 122 includes resource drivers which allow software applications installed on or accessed by the network terminals 200 to communicate with the network resources 104. As will be explained below, in order for a network terminal 200 to communicate with a selected network resource 104, the network terminal 200 first downloads driver application data from the administration server 108 over the communications network 112. The network terminal 200 may also download the appropriate resource driver from the driver database 122 (via the authorization server 110 over the communications network 112), and then allow the authorization server 110 to configure the downloaded resource driver in accordance with the access level field 306 of the resource record 300 associated with the selected network resource 104. Preferably, each resource driver includes a resource driver identifier which allows the authorization server 110 to identify the resource driver which the network terminal 200 has downloaded. It is also recognised that the driver database 122 can contain generic drivers to permit appropriate consumption/processing of the application data by the receiving network resource 104. The following is only one example of driver configuration of the network terminal 200 used to configure the application data for subsequent consumption/processing by the target network resource 104. It is also recognised that the network terminals 200 and the corresponding network resources 104 could be preconfigured with a generic driver to provide for preconfigured transmission and consumption/processing of the application data.

The example dynamically configurable driver application will now be discussed in association with FIG. 2. As discussed above, the DISC 210 of the network terminal 200 includes data which, when loaded into the RAM 212 of the network terminal 200, comprise processor instructions for the CPU 208. As shown, the downloaded driver application data defines in the RAM 212 a memory object comprising a driver application 400. The driver application 400 includes a generic resource driver 402 and a wrap-around resource driver layer 404. The generic resource driver 402 allows the network terminal 200 to communicate with a variety of different network resources 104, however the generic resource driver 402 typically will not provide the network terminal 200 with access to all the features and capabilities of any particular network resource 104. If the network terminal 200 requires additional features not implemented with the generic resource driver 402, the appropriate resource driver may be downloaded from the driver database 116, as mentioned above.

The wrap-around driver layer 404 includes an application communication layer 406, a driver administrator layer 408, and a data transmitter layer 410. The application communication layer 406 is in communication with the resource driver 402 (generic or network resource specific) and the application software installed on the network terminal 200, and is configured to transmit user application data between the application software and the resource driver 402. The driver administrator layer 408 communicates with the resource registry 106 over the communications network 112 to ensure that the driver application 400 is properly configured for communication with the selected network resource 104. The data transmitter layer 410 is in communication with the resource driver 402 and is configured to transmit the data output from the resource driver 402 over the communications network 112 to the selected network resource 104, via the network interface 202. Although the driver application 400 and its constituent component layers are preferably implemented as memory objects or a memory module in the RAM 212, it will be apparent that the driver application 400 may instead be implemented in electronic hardware, if desired.

Returning to FIG. 1, the registration database 124 of the resource registry 106 includes user records each uniquely associated with a user of a respective network terminal 200 upon registration with the network resource access system 100. The user record may identify the name of the registered user, a post office address and an e-mail address. In addition, each user record specifies a unique password which the registered user must specify in order to update the user's user record, and to obtain access to network resources 104 configured for "authorized access". The user record may also include additional information specifying default options for the network resource access system 100. For instance, the user may specify that the network resource access system 100 should provide the user with an acknowledgement e-mail message when a message is successfully transmitted to a selected network resource 104. The user may also specify an archive period for which the network resource access system 100 should archive the message transmitted to the selected network resource 104. This latter option is advantageous since it allows the user to easily transmit the same message to multiple network resources 104 at different times, and to periodically review transmission dates and times for each archive message.

The administration server 108 is in communication with the resource database 120 and the registration database 124. The administration server 108 provides administrators of the network resources 104 with access to the records of the resource database 120 to allow the administrators to update the network address field 302, the resource type field 304, the user access level field 306, the resource information field 308, the location information field 309, the pseudo-name field 310, the username/password field 312 and/or the driver identifier field 314 of the resource record 300 for the associated network resource 104. As will become apparent, this mechanism allows network administrators to change, for example, the network address and/or the restrictions/permissions of the network resources 104 under their control, or even the network resource 104 itself, without having to notify each network terminal 200 of the change. The administration server 108 also provides controlled access to the registration database 124 so that only the user of the network terminal 200 which established the user record can update the user record.

Where the username/password field 312 has been completed, the administration server 108 is configured to block access to the resource record 300 until the administrator provides the administration server 108 with the correct username/password key. This feature allows the resource administrator to make adjustments, for example, to pricing and page limit, in response to demand for the network resources 104, and to make adjustments to the restrictions/permissions set out in the user access level field 306 and the resource information field 308 and thereby thwart unauthorized access to the network resources 104.

The authorization server 110 is in communication with the resource database 120 and the driver database 122 for providing the network terminals 200 with the resource drivers 402 appropriate for the selected network resources 104. Preferably, the authorization server 110 is also configured to configure the driver application 400 for communication with the selected network resource 104, by transmitting the network address of the selected network resource 110 to the data transmitter layer 410 over a communications channel secure from the user of the network terminal 200 so that the network address of the network resource 104 is concealed from the user of the network terminal 200. In the case where the communications network 112 comprises the Internet, preferably the secure communications channel is established using the Secure Sockets Layer ("SSL") protocol. It is also recognised that the authorization server 110 can be used to provide the network terminal 200 with a list of available network resources 104 that are accessible by the user of the network terminal 200 and also are appropriate for consumption/processing of the particular application data 221 as desired by the network terminal 200 user (e.g. specific network resources 104 may provide certain desired processing features while others may not). Examples of specific processing/consumption features of the network resources 104 that can be specified by the network terminal 200 can include features such as but not limited to: colour, print quality, print resolution, viewing resolution, processing cost, location of the resource 104, etc.

In addition to the network terminal 200, the network resource 104, the resource registry 106, the administration server 108, the authorization server 110, and the communications network 112, the network resource access system 100 can also include optionally a transaction server 126 and an archive server 128. The transaction server 126 is in communication with the authorization server 110 for keeping track of each data transfer between a network terminal 200 and a network resource 104. For each transmission, preferably the transaction server 126 maintains a transmission record identifying the network terminal 200 which originated the transmission, the network resource 104 which received the transmission, and the date, time and byte size of the transmission.

The archive server 128 is configured to retain copies of the data transmitted, for a specified period. As discussed above, the user of a network terminal 200 specifies the requisite archive period (if any) for the data transmission, upon registration with the network resource access system 100. Preferably, the administration server 108 provides controlled access to the transaction server 126 and the archive server 128 so that only the user of the network terminal 200 which originated transmission of the data is allowed access to the transmission record associated with the transmission.

Figure 4A:
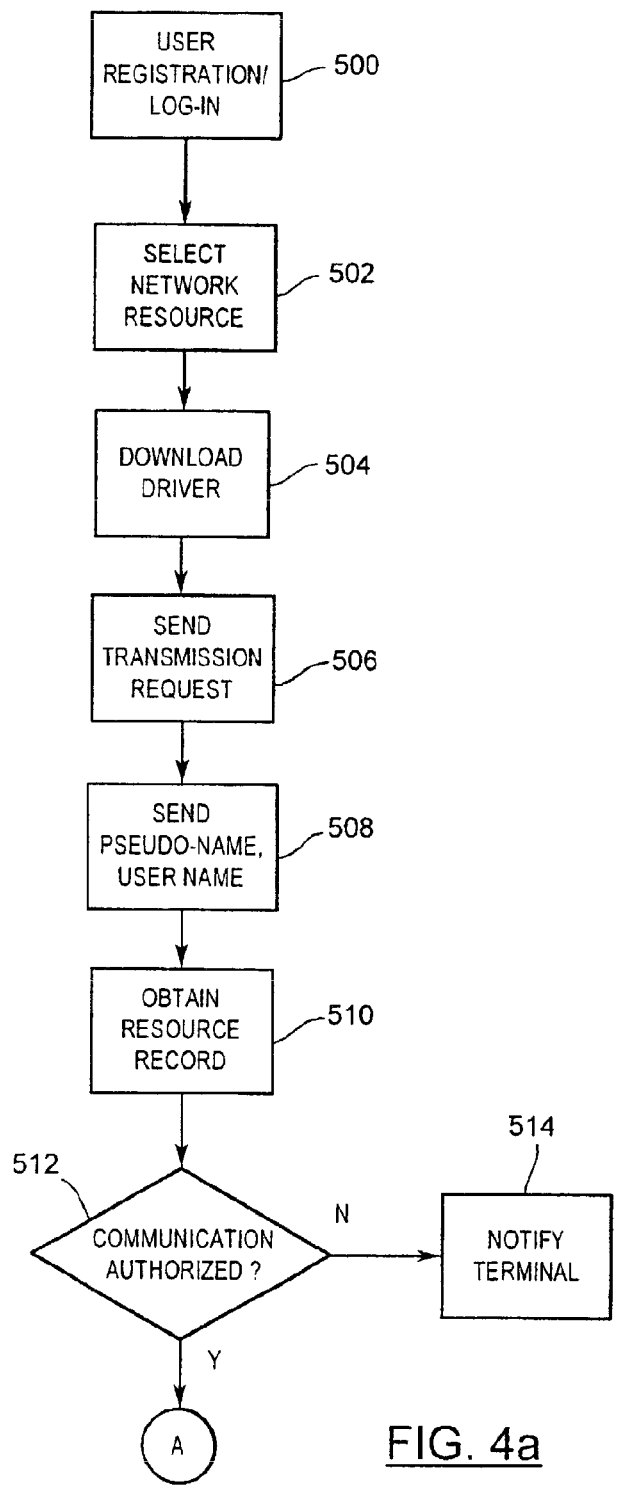
FIG. 4 is a flow chart depicting the method of operation of the network resource access system.
Figure 4B:
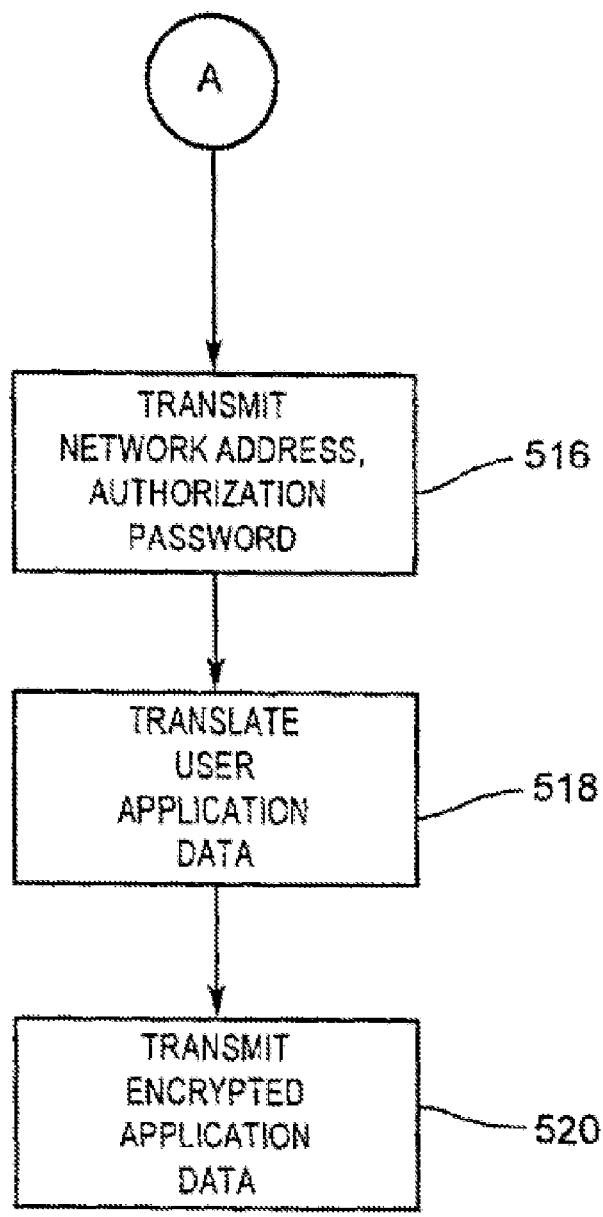

The process by which a user of a network terminal 200 can communicate with a network resource 104 is now described by example with reference to FIG. 4. The following discussion presupposes that the user of the network terminal 200 has downloaded or otherwise has a suitable driver application 400 (e.g. from the administration server 108 over the communications network 112). At step 500, the user of a network terminal 200 decides whether to log in to the network resource access system 100. As discussed above, if the user registers with the network resource access system 100 and subsequently logs in to the network resource access system 100 (by providing the authorization server 106 with the user's assigned password), the user will have access to any network resources 104 which have "authorized access" as the user access level and which have identified the registered user as a user authorized to access the network resource 104. If the user does not register or fails to log in to the network resource access system 100, the user will only have access to network resources 104 which have established "public access" as the user access level.

At step 502, the user selects a network resource 104 by querying the administration server 108 for a list of available network resources 104. Alternately, the user may postpone selection of a network resource 104 until initiation of the transmission command. The network user query may be based upon any desired criteria, including print turn-around time and page size (where the target network resource 104 is a printer), price, and geography. In addition, the user may provide the administration server 108 with the geographical coordinates of the user to determine the user's nearest network resources. The user may provide its geographical coordinates through any suitable mechanism known to those skilled in the art, including latitude/longitude co-ordinates, GPS, and wireless triangulation. Other methods of obtaining geographical coordinates may also includes WI-FI based services, such as those offered by Skyhook Wireless.

If the user requested a list of available network resources 104, the user is provided with a list of pseudo-names associated with each network resource 104 satisfying the designated search criteria. As discussed above, if the user logged in to the network resource access system 100, the pseudo-name list will include both "public access" network resources 104 and "authorized access" network resources 104 with which the user has been authorized to communicate. Also, if the user is member of an enterprise having network resources 104 registered with the network resource access system 100, the pseudo-name list will also identify network resources 104 which have been registered by the enterprise for "private access". Otherwise, the pseudo-name list will only identify network resources 104 registered for public access. Upon receipt of the resource list, the user selects a network resource 104 from the list.

At step 504, the administration server 108 queries the network user's network terminal 200 for the resource driver identifier of the resource driver 402 configured on the network terminal 200, and then compares the retrieved resource driver identifier against the resource driver identifier specified in the network driver identifier field 314 of the resource record 300 associated with the selected network resource 104 to determine whether the driver application 400 has been configured with the appropriate resource driver 402 for communication with the network resource 104. If the network terminal 200 has not been configured with the appropriate resource driver 402, the administration server 108 prompts the user's network terminal 200 to download the necessary resource driver 402. As will be apparent, the downloaded resource driver 402 becomes part of the driver application 400.

When the user of the network terminal 200 is ready to communicate with the selected network resource 104, the user of the network terminal 200 transmits a transmission request via its application software to the driver application 400, at step 506. If the user did not select a network resource 104 at step 502, the application communication layer 406 of the driver application 400 contacts the administration server 108 over the communications network 112 and prompts the user to select a network resource 104, as described above. Once a network resource 104 is selected, and the appropriate resource driver 402 is installed, the application communication layer 406 notifies the driver administrator layer 408 of the transmission request.

At step 508, the driver administrator layer 408 provides the authorization server 110 with the transmission request and identifies the selected network resource 104, by transmitting to the authorization server 110 the pseudo-name assigned to the selected network resource 104. If the user of the network terminal 200 has registered and logged in to the network resource access system 100, the driver administrator layer 408 also provides the authorization server 110 with the registered user's name.

The authorization server 110 then queries the resource database 120 with the received pseudo-name for the resource record 300 associated with the pseudo-name, at step 510. The authorization server 110 then extracts the user access level from the user access level field 306 of the retrieved resource record 300, and determines whether the network terminal 200 is authorized to communicate with the selected network resource 104, at step 512. As will be apparent from the foregoing discussion, if the user access level field 306 specifies "public access" for the network resource 104, the network terminal 200 will be automatically authorized to communicate with the network resource 104.

However, if the user access level field 306 specifies "private access" for the network resource 104, the authorization server 110 determines the network address of the network terminal 200 from the transmission request transmitted by the network terminal 200, and then queries the user access level sub-field with the terminal's network address to determine whether the network terminal 200 is authorized to communicate with the network resource 104. In the case where the communications network 112 comprises the Internet, the authorization server 110 can determine the network terminal's network address from the IP packets received from the network terminal 200. On the other hand, if the user access level field 306 specifies "authorized access" for the network resource 104, the authorization server 110 queries the user access level sub-field with the user's name to determine whether the network terminal 200 is authorized to communicate with the network resource 104.

If the query at step 512 reveals that the network terminal 200 is not authorized to communicate with the network resource 104, at step 514 the authorization server 110 provides the network terminal 200 with a notification that the network terminal 200 is not authorized for communication with the selected resource 104. However, if the query at step 512 reveals that the network terminal 200 is authorized to communicate with the network resource 104, the authorization server 110 queries the network address field 302 of the resource record 300 associated with the network resource 104 for the network address of the network resource 104. The authorization server 110 then establishes a secure communications channel with the driver administrator layer 408, and then transmits the network address to the driver administrator layer 408 over the secure communications channel, at step 516.

Also, if the user access level field 306 specifies "authorized access" for the network resource 104, and the network terminal 200 is authorized to communicate with the network resource 104, the authorization server 110 queries the user access level sub-field for the authorization password assigned to the network resource 104, and then transmits the authorization password to the driver administrator layer 408 over the secure communications channel, together with the network address. In the case where the communications network 112 comprises the Internet, preferably the authorization server 110 establishes the secure communications channel using a Secure Sockets Layer ("SSL") protocol. Since the network address and the authorization password are transmitted over a secure communications channel, this information is concealed from the user of the network terminal 200.

Preferably, the authorization server 110 also extracts the resource driver identifier from the resource identifier field 314 of the resource record 300, and determines whether the network terminal 200 is still properly configured for communication with the network resource 14. If the network terminal 200 no longer has the correct resource driver 402, the authorization server 110 queries the driver database 122 for the correct resource driver 402, and prompts the user of the network terminal 200 to download the correct resource driver 402. This driver configuration verification step may be performed concurrently or consecutively with the network address providing step described in the preceding paragraph.

In addition, the administration server 108 queries the registration database 124 to determine whether the user of the network terminal 200 registered with the network resource access system 100. If the user registered with the network resource access system 100 and specified that the archive server 128 should maintain archival copies of data transmissions, the administration server 108 transmits the network address of the archive server 128 to the driver administrator layer 408. As a result, when the user of the network terminal 200 issues a data transmission command, the driver application 400 will transmit the user application data to the selected network resource 104 and to the archive server 128.

At step 518, the application communication layer 406 passes the application data received from the application software to the resource driver 402 for translation into a format suitable for processing by the selected network resource 104. Meanwhile, the driver administrator layer 408 interrogates the network resource 104, using the received network address, to determine whether the network resource 104 still resides at the specified network address, is operational and is on-line.

If the interrogated network resource 104 resides at the specified network address, is operational and is on-line, the resource driver 202 passes the translated application data to the data transmitter layer 410 of the driver application 400. Preferably, the data transmitter layer 410 compresses and encrypts the translated application data upon receipt. The data transmitter layer 410 also receives the network address of the network resource 104 from the driver administrator layer 408, adds the network address data to the compressed, encrypted data, and then transmits the resulting data over the communications network 112 to the network resource 104 at the specified network address, at step 520.

Preferably, the data transmitter layer 410 also transmits details of the transmission to the transaction server 126, such as the selected network resource 104 and the byte size of the transmission. Upon receipt of the transmission details, preferably the administration server 108 queries the resource database 120 and the user registration database 124 for the e-mail address of the resource administrator and the e-mail address of the user of the network terminal 200, if provided, and then transmits an email message indicating completion of the transmission.

If the user access level field 306 specifies "authorized access" for the network resource 104, the data transmitter layer 410 also receives the authorization password for the network resource 104 from the driver administrator layer 408, and transmits the authorization password (as part of the compressed, encrypted data) to the network resource 104.

If the user access level field 306 specifies "public access" for the network resource 104, preferably the network resource 104 is accessible through a local server which serves to queue, decrypt and decompress the application data, and extract the network address data, and then transmit the decompressed application data to the appropriate network resource 104. Alternately, the network resource 104 itself may be configured for direct communication over the communications network 112, such as an IPP-capable printer, so that the network resource 104 is able to process the application data directly.

If the user access level field 306 specifies "authorized access" for the network resource 104, preferably the network resource 104 is accessible through a local server which serves to queue, decrypt and decompress the application data, and extract the network address data and authorization password, and then transmit the application data to the appropriate network resource 104 if the received authorization password is valid.

If the user access level field 306 specifies "private access" for the network resource 104, typically the network resource 104 will be located behind a firewall. Accordingly, the proxy server 114 associated with the network resource 104 will receive the application data, and transfer the application data to the proxy server queue. The polling server 116 associated with the network resource 104 will poll the proxy server 114 to determine the status of the queue. Upon receipt of a polling signal from the polling server 116, the proxy server 114 transmits any queued application data from the proxy server queue, through the firewall, to the polling server 116. The polling server 116 then extracts the network address from the received application data, and transmits the application data to the appropriate server 118 or network resource 104 for processing.

As will be apparent from the foregoing discussion, regardless of the user class defined for a network resource 104, if a resource administrator relocates a network resource 104 to another network address, and/or changes the device type and/or restrictions/permissions associated with the network resource 104, the resource administrator need only update the resource record 300 associated with the network resource 104 to continue communication with the network resource 104. Subsequently, when a user attempts communication with the network resource 104 using the original pseudo-name, the authorization server 110 will provide the administrator layer 408 with the updated network address of the network resource 104, or prompt the user to download the appropriate resource driver 402, assuming that the network terminal 200 is still authorized to communicate with the network resource 104.

Further, if the user access level field 306 specifies "authorized access" for the network resource 104 and the resource administrator desires to change the pseudo-name and authorization password associated with the network resource 104, the resource administrator need only update the pseudo-name and authorization password provided on the resource record 300. Subsequently, when a user of a network terminal 200 initiates communication with the network resource 104 using the original pseudo-name, the authorization server 110 scans the resource records 300 for occurrences of the original pseudo-name. After locating the appropriate resource record 300, the authorization server 110 provides the driver administrator layer 408 with the updated pseudo-name and authorization password of the network resource 104, provided that the network terminal 200 is still authorized to communicate with the network resource 104. A network terminal 200 which is not authorized to communicate with the network resource 104 will not receive the updated pseudo-name and authorization password from the authorization server 110 and, consequently, will not be able to communicate with the network resource 104, even if the user of the network terminal 200 knew the network address for the network resource 104.

Figure 5:
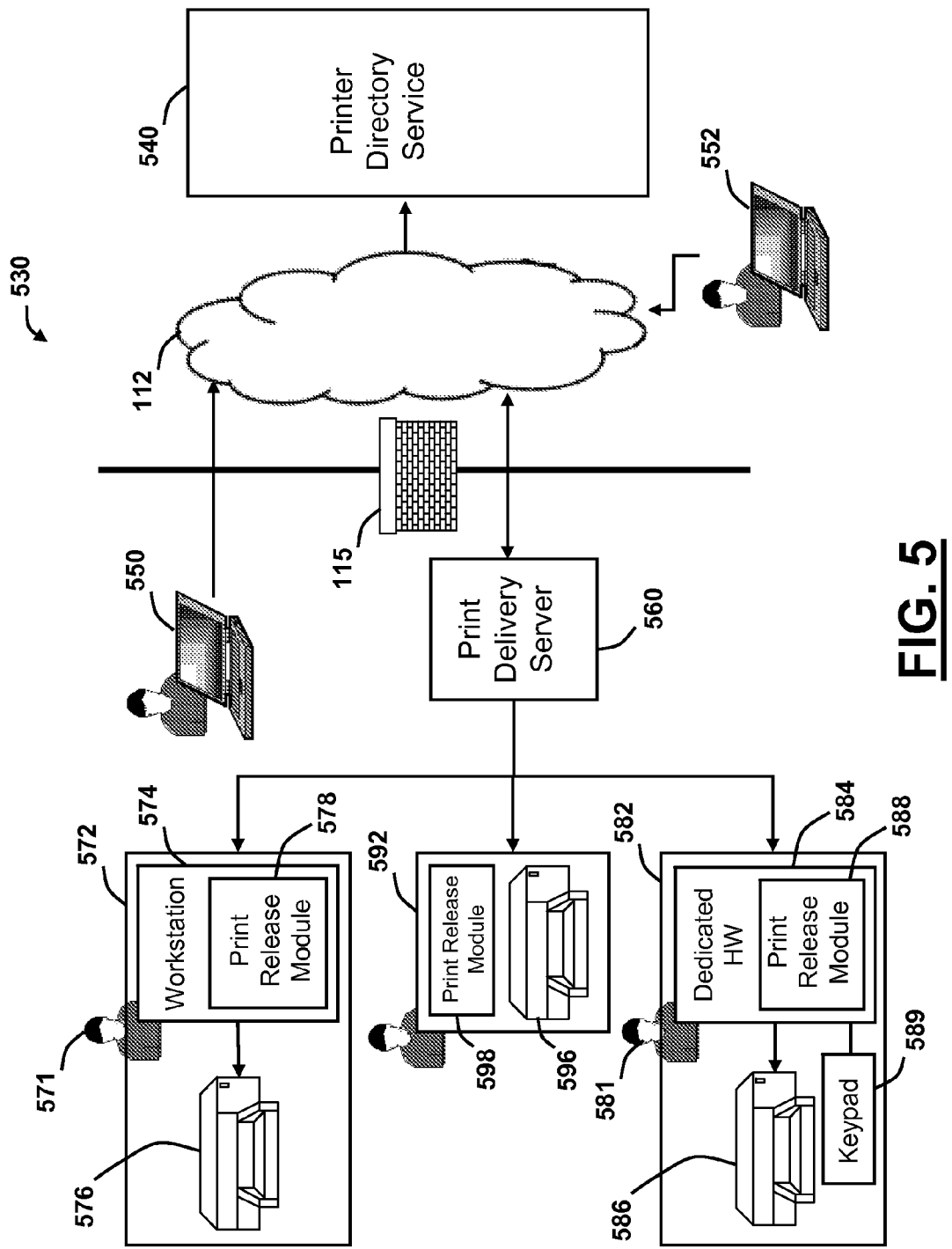
FIG. 5 is a schematic of a printer resource access system that allows network terminals to access printer resources through printer directory service hosted on communications network.

Referring to FIG. 5, shown is a schematic of a printer resource access system 530 that allows network terminals to access printer resources through printer directory service 540 hosted on communications network 112. Printer directory service 540 is an embodiment of a network resource access system specifically for accessing printer resources and the like. Printer directory service 540 may include any one or more of: resource registry 106, administration server 108 and authorization server 110. Each such server making up printer directory service 540 may be implemented in one or more server computers across one or more locations. Although FIG. 5 shows print directory service 540 providing access to a single network to the left of firewall 115, typically print directory service 540 provides services over a number of different private networks or LANs connected to communications network 112.

Network terminal 550 is provided as an example of a network terminal that accesses printer directory service 540 through firewall 115. Elements to the left of the firewall may be on a private network or LAN and elements to the right of the firewall may be on a public network, such as, for example, the public internet. An example of a network terminal behind a firewall may include a personal computer or laptop located on a corporate or campus LAN that accesses printer directory service 540 through an exception in firewall 115. Network terminal 552 is provided as an example of a network terminal that is located outside of firewall 115 and connects to printer directory service 540 through communications network 112. Examples of network terminals that are located outside firewall 115 may include any computing device with an internet connection that is not provided through firewall 115, such as, for example, a laptop that is connected to a cellular data network.

Network terminals preferably access printer directory service 540 to identify a specific location or printer resource to which to send print job data. The term print job data may be used to refer to the electronic document itself or any electronic format that may be processed or printed by a printer resource. Network terminals may process an electronic document for printing that may be further processed by a printer resource. For example, the driver application discussed herein may be used to process electronic documents for printing by a specific printer resource. In some embodiments, network terminals may submit electronic documents directly to the printer directory service 540. In other embodiments, printer directory service 540 may provide a web interface that allows a network terminal to obtain secure access to specify a printer and submit an electronic document.

Print job data from a network terminal may be routed through communication network 112 and printer directory service 540 to print delivery server 560. Alternatively, print directory service 540 may provide network terminals with connection information for print delivery server 560 located on the same network as the network terminal, and the network terminal then routes the print job data directly to the print delivery server 560. Some embodiments may employ a proxy server and polling server such as those described with respect to FIG. 1. The proxy server's network address on communications network 112, such as a public IP address, may be provided by print directory service 540 to network terminals 552 to route print job data through communications network 112.

Print delivery server 560 receives print job data and serves as a queue for print jobs associated with printer resources served by print delivery server 560, such as printer resources 572, 582 and 592 shown in FIG. 5. In other embodiments, there may be multiple print delivery servers that are each associated with a printer resource. Print delivery server 560 facilitates communication with printer resources located behind firewall 115 and distributes print job data to the appropriate printer resource. Although only a single and separate print delivery server 560 is shown in FIG. 5, other embodiments may include multiple print servers with associated printer resources, or alternatively, the print delivery server may be embodied in the printer resources themselves.

A printer resource preferably comprises a printer that produces hard copy documents from electronic files, but other embodiments may employ virtual paper devices, such as e-readers or public displays as possible printer resources. A printer resource may also comprise additional hardware and software to perform the functions of the printer resource and provide network connectivity for the printer. Printer resource 572 comprises a workstation 574 that connects to a peripheral printer 576. Workstation 574 may be a personal computer or other computing device connected to a printer that provides graphical user interface and input mechanism that allows a user to interact with the printer resource. Printer resource 582 comprises a dedicated hardware device 584 connected to a peripheral printer 586. Dedicated hardware device 584 may be a computing device that is dedicated to providing printer resource functions with limited functionality outside this purpose. Dedicated hardware device 584 is typically a computing device with limited processing power and memory that is provided as a more cost efficient printer resource compared to a workstation implementation. Dedicated hardware device 584 may operate without a display or traditional input devices, such as a mouse or keyboard. Printers 576, 586 may connect to their corresponding hardware device using known methods to connect peripheral devices, including, but not limited to, USB or parallel port connections.

Printer resource 592 represents a printer, shown as printer 596, that comprises sufficient hardware and software to perform the function of printer resource 592 without the assistance of external hardware. For example, a network connected printer may have a processor and memory that allow the network printer to be programmed to perform the functions of a printer resource in printer resource access system 530. In either the computer connected or standalone printer embodiments, the printer resource comprises a microprocessor and computer memory. The computer memory may include volatile storage, for example, various known RAM memory known to a person skilled in the art, and also non-volatile memory, for example, flash ROM-type memory or magnetic memory.

Each printer resource 572, 582, 592 has a corresponding print release module 578, 588, 598 that is responsible for releasing print jobs from print delivery server 560. Other embodiments could include a print release module that is located at the print delivery server 560 to release print jobs to any of the printer resources served by print delivery server 560. Print release modules may be implemented, either in whole or in part, as software that is stored in memory and executed by a microprocessor of the printer resource. Print release modules provide a means for a user to submit authentication information in order to release one or more print jobs from the print delivery server 560 that is associated with the user or supplied authentication information.

User 571 may interact with printer release module 578 through the user interface of workstation 572. Workstation 572 may display a prompt on a graphical user interface that requests access credentials, such as a username and password, that are then authenticated. The access credentials may be associated with the printer directory service 540 and authenticated with an authentication server of printer directory service 540, similar to authorization server 110 described above. Alternatively, access credentials may be verified with an other 3$^{rd}$ party service provided through communications network 112, such as, for example, an OpenID provider. Also, the access credentials may be verified with a local LDAP server behind firewall 115 or locally on the workstation 574. Print release module 578 may then provide a list of print jobs on the print delivery server 560 that are associated with the authenticated user. The authentication information, or portion thereof, may be contained within metadata associated with the print job that print release module 578 uses to match the authentication information provided by the user to one or more print jobs.

Alternative embodiments may utilize the login credentials and account information used to access the workstation itself or the operating system of the workstation. User 571 may be required to provide authentication information that allows the user to login to the operating system. For example, if workstation 574 is a WINDOWS NT workstation, a user can provide their WINDOWS user account credentials to access workstation 574. Print release module 578 may then determine if any print jobs are associated with that user account on print delivery server 560. Alternatively, user 571 may log into the operating system as a "local" administrator and be presented with all print jobs that are available on print delivery server 560.

Other embodiments may allow a user to simply enter an identifier without a password as the authentication information. For example, the identifier could include an email address or a username without a password. Print release module 578 may then determine print jobs associated with the identifier.

Printer resources with limited display and input capabilities may provide other methods for releasing print jobs from print delivery server 560. Dedicated hardware device 584 may include keypad 589 that allows a user to supply a release code. The release code is another type of authentication information and is an identifier for print jobs being held on a given print delivery server. Printer directory service 540 may provide the release code to the user upon submitting a print job and ensures that the release code is unique for a given print delivery server. User 581 may enter a release code on keypad 589 and then print release module determines if any print jobs queued on print delivery server 560 are associated with the release code. Keypad 589 may also be used with workstation 572 or printer resource 592. Printer resource 592 may also include a built-in keypad on the printer, and printer resource 592 may be programmed to accept release codes through the built-in keypad.

Other embodiments may also employ a hardware key interface that accepts a key from a hardware device. Hardware key interface may include, but are not limited to, infrared or RF key fobs, RFID tags, magnetic card readers, smart card readers and other wireless networking devices. Some embodiments of printer resources may include a wireless network interface and use the MAC address of a nearby wireless device as authentication information, or a portion thereof.

Print release modules may also receive authentication information and provide print job information over the network interface of the printer resource. Printer resources may include wired and/or wireless network interfaces that can be configured to accept authentication information used to release print jobs. In some embodiments, a printer resource may operate a web server that provides a web interface that allows user to connect through a web browser and enter authentication information to release print jobs. The web server may be accessible only on the LAN for security purposes or be accessible over communication network 112 through firewall 115. Other embodiments may allow a mobile network terminal to negotiate with the print release module over the network interface to exchange keys to authenticate a user that would then be shown a list of print jobs the user is allowed to release.

Printer resource access system 530 may employ any number and combination of print release mechanisms that may each requiring a different type of authentication information. Authentication information may include a release code, username and password credentials, a unique user identifier, a hardware key, or any other type of information that identifies the user or the print job that provides access to the print jobs. Print release mechanisms can include keypads, login prompts, hardware key devices, network interfaces or any other means to obtain authentication information from a user. A single printer resource may also provide multiple print release mechanisms that each may require different authentication information.

Figure 6:
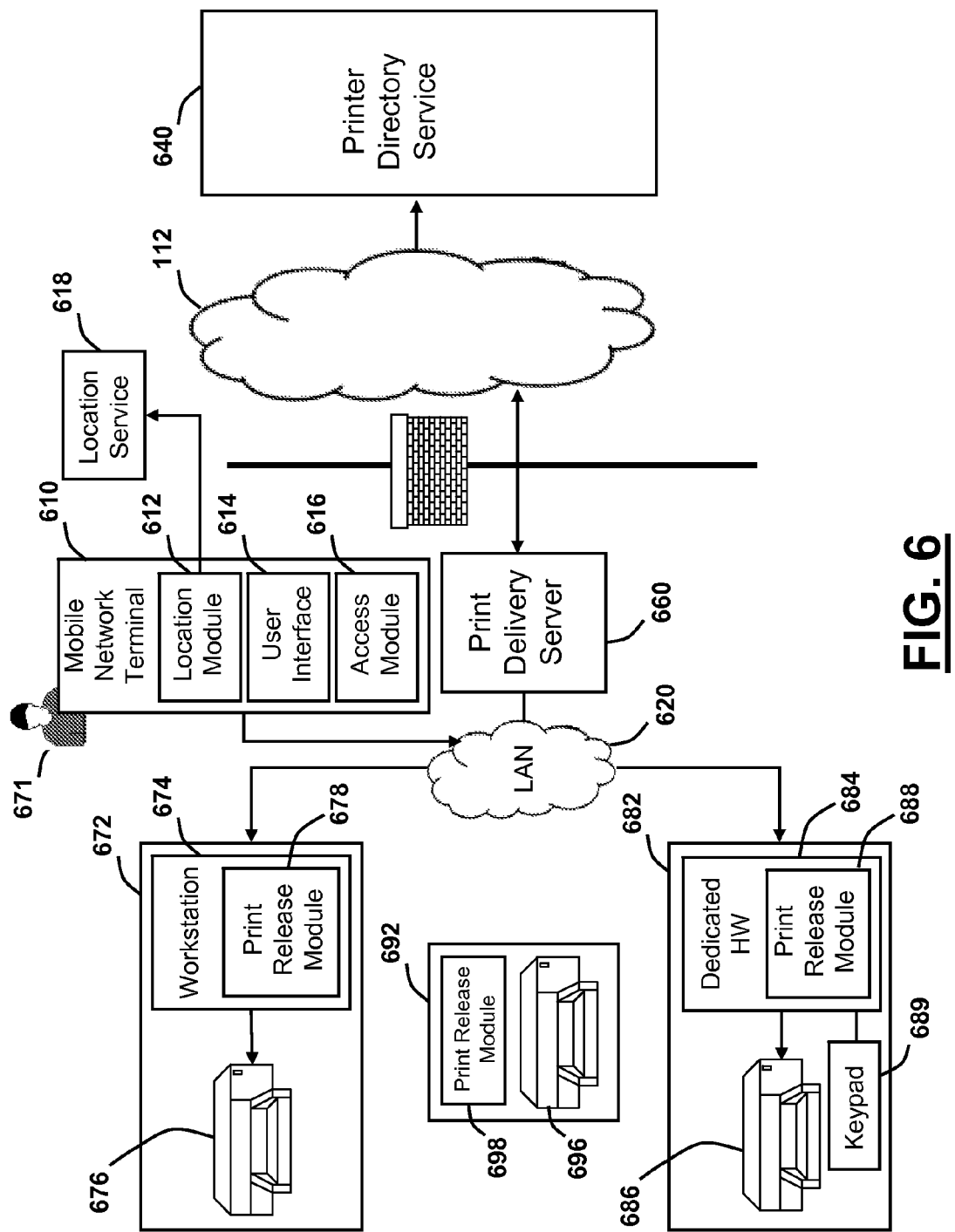
FIG. 6 is a schematic of a printer resource access system that allows a mobile network terminal to release print jobs stored on a print delivery server through a printer directory service hosted on a communication network.

Referring to FIG. 6, shown is a schematic of a printer resource access system 600 that allows a mobile network terminal 610 to release print jobs stored on print delivery server 660 through printer directory service 640 hosted on communication network 112. A similar numbering scheme to FIG. 5 is used such that similar elements are similarly numbered. Print jobs queued on printer delivery server 660 may have been submitted from mobile network terminal 610 or other network terminals, such as network terminals 200 shown in FIG. 1 or network terminals 550, 552 shown in FIG. 5.

Mobile network terminal 610 may include a wireless network interface that allows mobile network terminal 610 to communicate over LAN 620 or communications network 112. Mobile network terminal 610 may be portable so that user 611 can transport the device to a nearby printer resource. Mobile network terminal 610 may or may not be capable of submitting print jobs through print directory service 640. Examples of mobile network terminals may include smart phones, PDAs, laptops, or other portable computers. Mobile network terminal 610 typically includes a processor and memory that allow the mobile network terminal 610 to be programmed to operate within printer resource access system 600. The memory may include volatile storage, for example, various known RAM memory types, and also non-volatile memory, for example, flash ROM-type memory or magnetic memory. Location module 612, user interface 614 and access module 616 may be implemented in either hardware, software or a combination thereof.

Location module 612 operates to collect location information from a location service 618 to provide location information data to mobile network terminal 610. The location information is preferably in the form of geographical coordinate data, such as, for example, Global Positioning System ("GPS") coordinate data specifying latitude, longitude and elevation. In some embodiments, location service 618 may comprise the GPS satellite network and the location information collection module 612 may comprise a GPS transceiver for obtaining GPS coordinate data.

Location information may also be obtained based on wireless site survey data or other network information. Wireless site survey data may be obtained through a wireless network interface card of mobile network terminal 610. Wireless site survey data typically includes one or more of MAC addresses of other nearby network interface cards, SSID-type information that identifies nearby wireless base stations, and the signal power associated with each. The wireless site survey data may then be submitted to location service 618 that can then return GPS-type coordinate data. Location service 618 may be provided by a server over communications network 112. An example of a location service based on this type of wireless data is offered by Skyhook Wireless. Network information could also confirm whether a mobile network terminal is connected to the same wired LAN as a printer resource based on information that identifies other devices on the network, such as, for example, the MAC addresses of printer resources. Other network information may also be used, such as IP address-based location information or services, that can provide additional location data based on the mobile network terminal's IP address that may be used to confirm or verify location information from other services or sources based on the location of the internet service provider.

For example, referring to FIG. 6, LAN 620 may represent a wireless network with one or more access points where some of printer resources 672, 682, 692 may have wireless network interfaces. Mobile network terminal 610 may collect signal strength information associated with an identifier for each printer resource and access point within range of the wireless network interface of mobile network terminal 610. The signal strength information may then be provided to location service 618 that refers to its database that correlates the identifiers of the wireless devices with physical locations. Since printer directory service 640 may also store physical location information and network identifiers associated with each printer resource, it too may function as location service 618.

If mobile network terminal 610 is a mobile phone with a cellular modem, location information may be obtained by location module 612 using multiple cell towers to perform multilateration, trilateration or triangulation. Location module 612 may also implement a hybrid approach using any combination of GPS, IP address-based service, wireless data and cell tower location techniques. In these approaches, location module 612 processes the location information data that is received before providing geographical coordinate data to other modules of mobile network terminal 671.

Location module 612 may then submit location information to printer directory service 640. In response, printer directory service 640 may provide a list of nearby printer resources or their associated release mechanism. User interface 614 may present the list of printer resources to user 611 for selection. In other embodiments, printer directory service 640 may only provide the closest printer resources.

In some embodiments, upon selection of a printer resource by user 611, user interface 614 may present to the user instructions and the required authentication information to provide to the selected print release module. The instructions are based on the type of release mechanism used by the printer resource. Using this method the user is only provided with the type of authentication information used with the release mechanism for the selected printer resource. Authentication information may be provided over a secure connection between mobile network terminal 610 and printer directory service 640 after user 611 has obtained authenticated access to printer directory service 640. Access module 616 of mobile network terminal provides authentication information to the print release module for a selected printer resource. For example, if the nearest printer resource is printer resource 682 that uses a release code based method to release a print job then the user interface would provide instructions and the correct release code for the user to enter. Access module 616 would then provide authentication information to print release module 688 of printer resource 682.

Printer directory service 640 can also provide connection and configuration information for print release module located nearby mobile network terminal 611. Connection and configuration information may include a network address of the printer resources on LAN 620 or a public IP address accessible through communications network 112. A public IP address may correspond to print delivery server 660 or a proxy server, such as proxy server 114, that then communicates with the appropriate release module of the printer resource to release the print job. In some embodiments, printer directory service 640 may also act as a proxy for distributing print release information. Printer directory service 640 may determine whether to provide a LAN network address based on information that is provided about the network to which mobile network terminal 610 is connected. Connection and configuration information may also include an indication of the type of authentication information that is required by the printer resource to release print jobs. Access module 616 may then use connection and configuration information to determine if mobile network terminal 610 can connect directly to the printer release module.

Access module 616 may be able to connect directly to the print release module if both the printer resource and mobile network terminal are connected to LAN 620. Access module 616 may attempt to connect to the provided network address using a standard protocol such as HTTP. Printer directory service 640 may also specify the protocol to use to connect to the selected printer resource. Whether a printer resource may accept a direct or indirect connection to release a print job may be specified by printer directory service 640.

User interface 614 may then prompt user 611 to provide the required authentication information for the selected printer resource. Once provided, access module 616 may securely transmit the authentication information to the printer resource through the appropriate network. If the provided authentication information corresponds to a single print job then the print job may be released by the printer resource. If the provided authentication information corresponds to a number of print jobs, print release module of the printer resource will provide a list of print jobs to mobile network terminal 610 for display on user interface 614. Selection of a print job from the list may require the user to enter additional authentication information that is specific to the print job.

In some embodiments, a hardware identifier may be provided by access module 616 to the print release module so that the user is not required to enter authentication information. Alternatively, the hardware identifier may be used as an additional layer of security along with other authentication information.

As an example of operation of system 600, user 611 with mobile network terminal 610 may approach printer resource 672 to release an earlier submitted print job. Location module 612 may collect geographical coordinates using location service 618, such as, for example, by using a GPS receiver to obtain latitude, longitude and elevation from the GPS satellite system. User 611 may provide access credentials to access printer directory service 640. Location module 612 may then provide the coordinates to print directory service 640 that in response provides connection and configuration information for printer resource 672 that is located nearest to the provided coordinates. User interface 614 prompts user 611 to provide the authentication information required by release module 678 of printer resource 672 to release the print job. Access module 616 may then attempts to connect with printer resource 672 using a network address accessible by mobile network terminal 610 over LAN 620. If the connection is successful and print release module 678 of printer resource 672 verifies the provided authentication information, the print job is released to printer 576.

Another example of operation of system 600 may include user 611 with mobile network terminal approaching printer resource 692. Printer resource 692 is not connected to the mobile network terminal 610 through LAN 620. Print directory service 640 may provide connection information for a proxy server that is part of printer directory service 640. User interface 614 may be adapted to accept the appropriate type of authentication information required to release a print job from printer resource 692. For example, printer resource 692 may require user 611 to provide a user identification number and release code that user interface 614 prompts the user to supply. Access module 616 of mobile network terminal 610 may provide authentication information to release the print job to the proxy server. Periodic polling of the proxy server by print delivery server 660 or printer resource 692 may retrieve the print release information from the proxy server.

Another example of operation of system 600 may include user 611 with mobile network terminal 610 near both printer resources 682 and 692. When location information is provided to printer directory service 640 from location module 612, the printer directory service may return a list including both printer resources 682 and 692. User interface 614 provides the list of printer resources to user 611 and requests a selection of a printer resource. The list may provide additional information for the printer resources, including, but not limited to, name, location description, available release mechanisms, print capabilities, printing costs or images that may assist a user in selecting an appropriate printer resource. In this example, user 611 selects printer resource 682, however, print release module 688 of printer resource 682 is not be configured to receive authentication information over a network connection. Printer directory service 640 may then provide all release mechanisms available to user 611 and user interface 614 prompts the user 611 to select a release mechanism. For example, assume user 611 selected the release code mechanism to release their print job, the user interface 614 would then provide the user with written instructions to release the print job from printer resource 682 (e.g. type release code #### on attached keypad). Print release code may be provided to the mobile network terminal over an authenticated and secure connection to print directory service 640 and displayed to user 611 on user interface 614. In addition, instructions may also include operation of any attached cost recovery mechanism.

Figure 7:
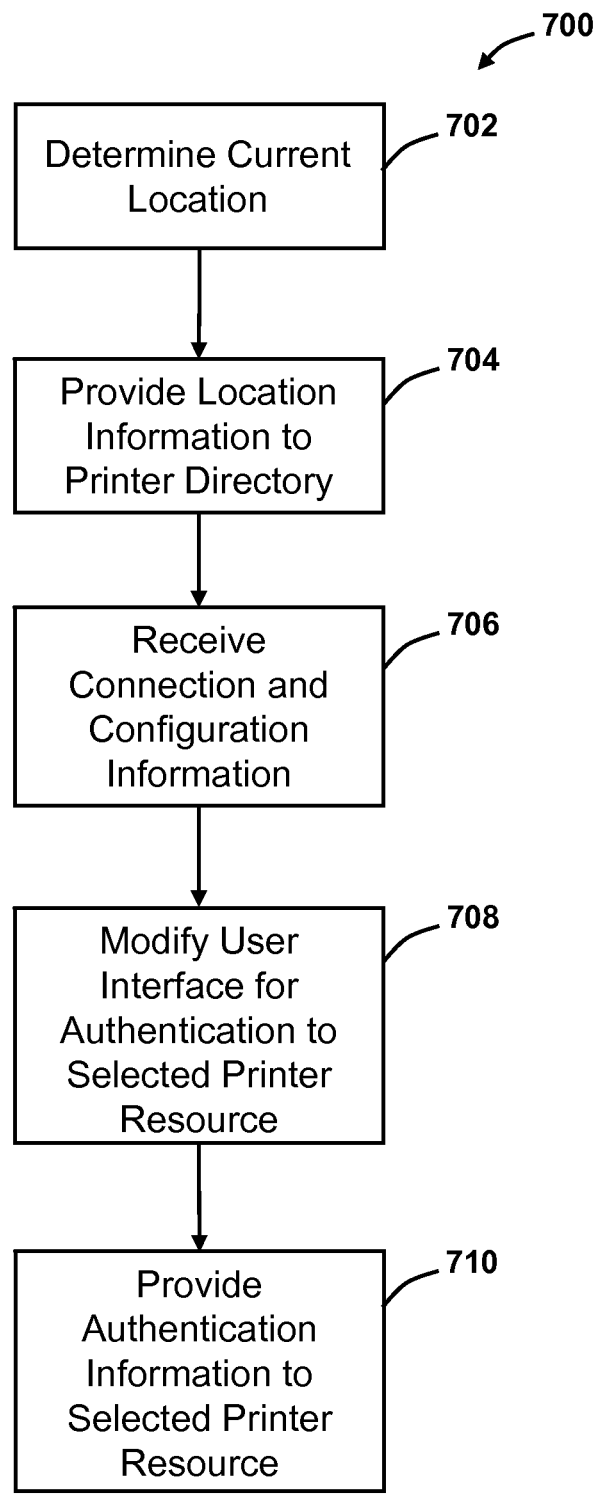
FIG. 7 is a flow chart diagram of a method for releasing a print job to a printer resource in proximity to a mobile network terminal.

Referring to FIG. 7, shown is a flow chart diagram of a method 700 for releasing a print job using a mobile network terminal in proximity to a printer resource. Method 700 may be performed by a mobile network terminal having a microprocessor and memory or other application specific hardware. Method 700 may be user-initiated through the user interface of a mobile network terminal. The steps of method 700 may be performed after a user or device has obtained secure and authenticated access to a printer directory service.

At step 702, the location of the mobile network terminal is determined. As described above, geographical coordinate location information may be obtained from a location service. Multiple location services may be used in determining the geographical coordinate location information to help provide a more accurate location. Next, at step 704, the acquired location information is provided to the printer directory service. Location information may be accompanied by a request to provide a listing of the nearest printer resources to the location, or alternatively, a request to provide only the closest printer resource to the location provided. If a list of printer resources is provided, user interface of mobile network terminal may allow a user to select the appropriate resource. Selection of a specific printer resource may then be communicated to the printer directory service.

At step 706, mobile network terminal receives connection and configuration information for the selected printer resource. Connection and configuration information may include network addresses or names that allow mobile network terminal to connect with the selected printer resource or its proxy. Connection and configuration information may also include an indication of the release mechanisms used and the required type of authentication information required for each.

After the connection and configuration information is received at the mobile network terminal, the user interface of the mobile network terminal is modified for authentication to the selected printer resource in step 708. The user interface may display information corresponding to the selected printer resource that may include, but not limited to, the printer resource name or pseudo-name, location, print capabilities and costs. In some embodiments, user interface of mobile network terminal may be adapted to provide instructions for using one or more of the release mechanisms of the selected printer resource. The user interface may also be adapted to accept input from the user to provide authentication information that may be used to release the print job. The user interface is adapted to only prompt the user for the authentication information that is required to release a print job from the selected printer resource. Some embodiments of the user interface may include a prompt for the user to provide a release code, email address or authentication credentials, including but not limited to credentials for accessing the printer resource or printer directory service.

At step 710, authentication information is provided to the selected release module to release the print job from the selected printer resource. Connection and configuration information may specify how mobile network terminal can provide authentication information to the selected printer resource. Authentication information is used by the print release module of the printer resource to release the print job. The authentication information may be provided through a connection directly negotiated between the mobile network terminal and the printer resource station. In some embodiments, if a direct connection is not possible the mobile network terminal may send the request to release the print job to the printer directory service or other proxy for the printer resource. In alternative embodiments, after authentication information is provided, the printer resource may provide a list of print jobs that allows the user to select one or more of the print jobs to release. Once a properly authorized request to release the print job is received by the print release module of the printer resource the print job data is sent to the printer to generate the physical document.

Figure 8:
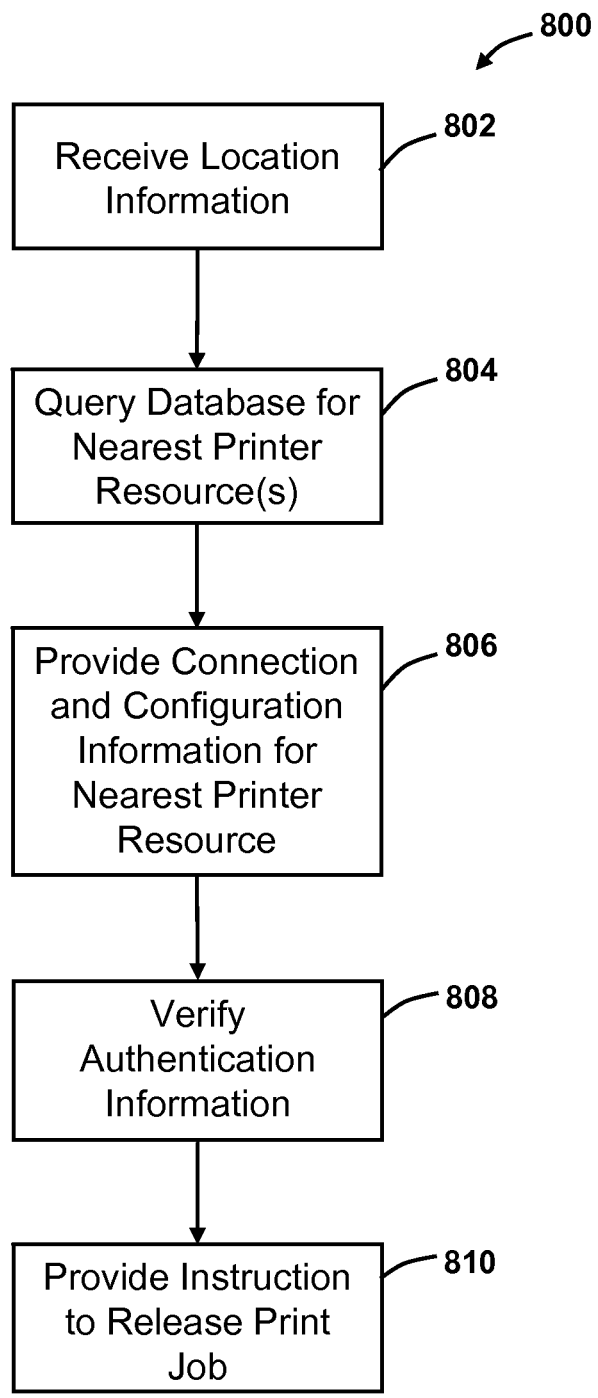
FIG. 8 is a flow chart diagram of method for releasing a print job to a printer resource from authentication information provided by a mobile network terminal in proximity to a printer resource.

Now referring to FIG. 8, shown is a flow chart diagram of method 800 for releasing a print job to a printer resource from information provided by a mobile network terminal in proximity to a printer resource. Method 800 may be performed by one or more servers having a microprocessor and memory or other application specific hardware. Example hardware may include any one or combination of a printer directory service, a print delivery server, a printer resources and proxy/polling servers. Method 800 may also involve providing secure and authenticated access to the one or more servers (not shown) for one or more of the steps.

At step 802 location information is received. The location information may also be associated with a request for the location of one or more of the nearest printer resources. Location information may be formatted as geographical GPS-type coordinates that include latitude, longitude and elevation. In some embodiments, location information may include information about the network and available network resources provided by the sending device.

Next, at step 804, a query of a database is performed to find the one or more nearest printer resources to the received location. The query may include a range limitation, for example, to return only those printer resources within a 20 foot radius of the provided location. The query may use geographical coordinates or other location information. Alternate embodiments may use network information, such as wireless network interface identifiers and signal strength information, to determine the nearest printer resources to which a direct connection may be made. The database may be a resource database, such as resource database 120 as described in FIGS. 1 and 3.

Once the nearest printer resources are determined, connection and configuration information for these printer resources may be provided in step 806. The database for the printer resources typically contains all the configuration and connection information for each of the nearest printer resources. As described above, the connection and configuration information allows a mobile network terminal to connect to a printer resource and configure the device for the available release mechanisms, among other things. In other embodiments, an additional server within the system may provide additional connection and configuration information.

Next, at step 808, authentication information is received to release a print job. Authentication information is typically associated with a request to release one or more print jobs. The authentication information is verified by the system to ensure that the request is authorized by the system. For example, verification may involve authenticating user credentials with an authorization server associated with the printer resource access system. In another example, verification may involve determining whether the authentication information is associated with the metadata that is stored along with the print job. Other approaches may also be implemented as described above with respect to FIGS. 5 and 6.

If the provided authentication information is verified, then instruction is provided to release the print job at step 810. Instruction to release the print job may be an interprocess communication between software modules on the same server or may involve communication over communications networks.

Figure 9:
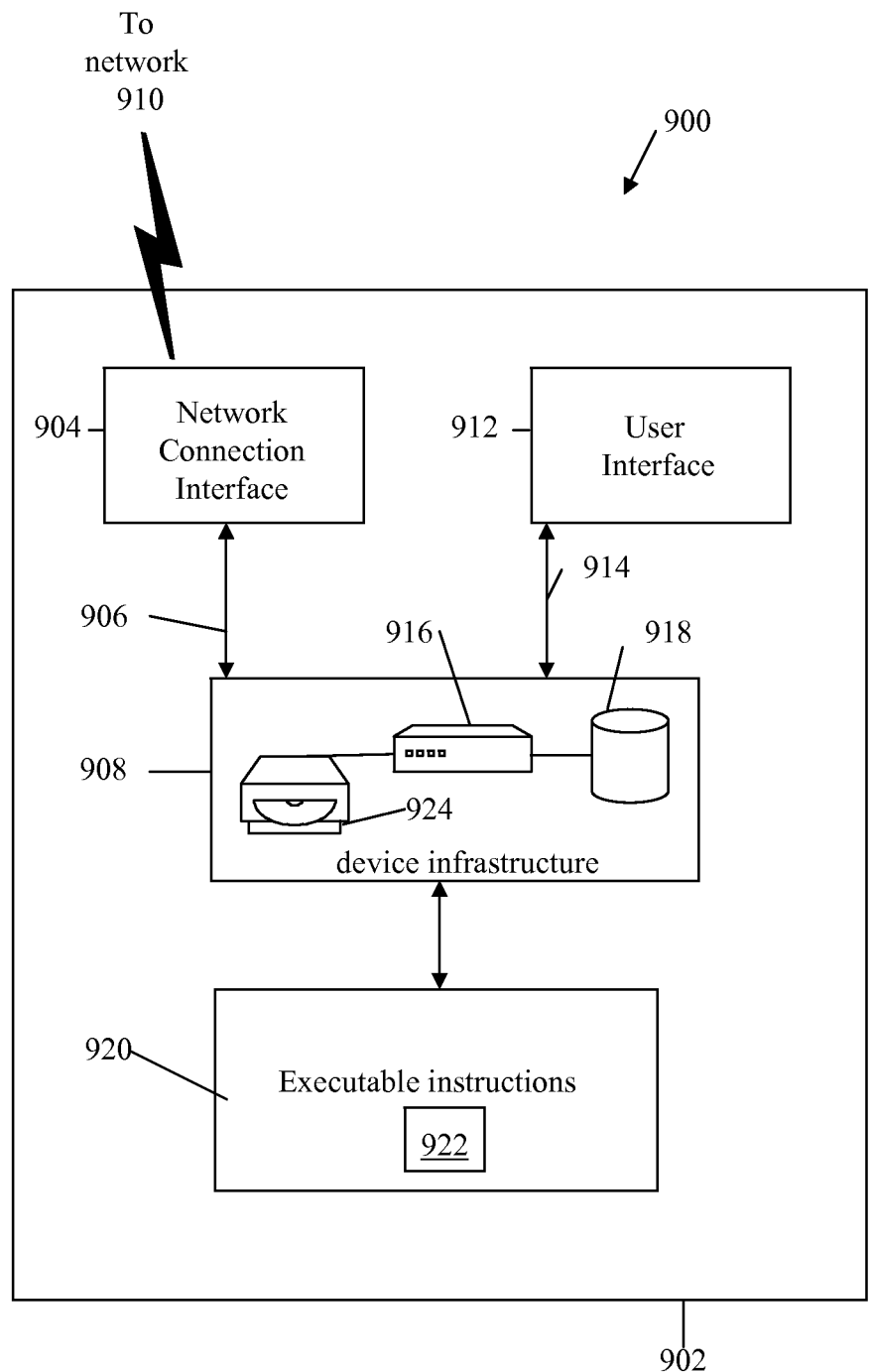
FIG. 9 is a block diagram of a computing device in a host system.

Referring to FIG. 9, shown is a block diagram of a computing device 902 in a host system 900. Network terminals, mobile network terminals, various servers, and printer resources, such as those shown in FIGS. 1, 2, and 5-6, may be implemented as an embodiment of host system 900 comprising one or more computing devices 902. One or more computing devices 902 may also be used to carry out the methods shown in FIGS. 7 and 8.

Computing device 902 can include a network connection interface 904, such as a network interface card or a modem, coupled via connection 906 to a device infrastructure 908. The network connection interface 904 is connectable during operation of the devices 902 to the network 910 (e.g. an intranet and/or an extranet such as the Internet), which enables the devices 902 to communicate with each other (e.g. that of mobile network terminal 610 with printer resource 672) as appropriate. Some devices may also include more than one network connection interface 904 to allow host system 900 to communicate over multiple networks. For example, a cell phone embodiment of a mobile network terminal may include a WI-FI network connection interface and a cellular modem. The network 910 can support the communication of the print requests for printer resources and administrative information, including, for example, print job data or location information.

Referring again to FIG. 9, the device 902 can also have a user interface 912, coupled to the device infrastructure 908 by connection 914, to interact with a user. The user interface 912 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 908.

Referring again to FIG. 9, operation of the device 902 is facilitated by the device infrastructure 908. The device infrastructure 908 may include one or more computer processors 916 and can include an associated memory 918 (e.g. a random access memory). The computer processor 916 facilitates performance of the device 902 configured for the intended task (e.g. of the respective module(s) of the printer resource or mobile device) through operation of the network interface 904, the user interface 912 and other application programs/hardware 920 (e.g. location information collection module 922) of the device 902 by executing task related instructions. These task related instructions can be provided by an operating system, and/or software applications 920 located in the memory 918, and/or by operability that is configured into the electronic/digital circuitry of the processor(s) 916 designed to perform the specific task(s). Further, it is recognized that the device infrastructure 908 can include a computer readable storage medium 924 coupled to the processor 916 for providing instructions to the processor 916 and/or to load/update the instructions 920. The computer readable medium 924 can include hardware and/or software such as, by way of example only, magnetic disks, magnetic tape, optically readable medium such as CD/DVD ROMS, and memory cards. In each case, the computer readable medium 924 may take the form of a small disk, floppy diskette, cassette, hard disk drive, solid-state memory card, or RAM provided in the memory module 918. It should be noted that the above listed example computer readable mediums 924 can be used either alone or in combination.

Further, it is recognized that the computing device 902 can include the executable applications 920 comprising code or machine readable instructions for implementing predetermined functions/operations including those of an operating system (e.g. modules of printer resources, mobile devices or servers in printer resource access system to carryout methods shown in FIGS. 7 and 8). The processor 916 as used herein is a configured device and/or set of machine-readable instructions for performing operations as described by example above. As used herein, the processor 916 may comprise any one or combination of, hardware, firmware, and/or software. The processor 916 acts upon information by manipulating, analyzing, modifying, converting or transmitting information for use by an executable procedure or an information device, and/or by routing the information with respect to an output device. The processor 916 may use or comprise the capabilities of a controller or microprocessor, for example. Accordingly, any of the functionality of the host system 900 (e.g. modules) may be implemented in hardware, software or a combination of both. Accordingly, the use of a processor 916 as a device and/or as a set of machine-readable instructions is herein referred to generically as a processor/module for sake of simplicity. Further, it is recognised that the host system 900 can include one or more of the computing devices 902 (comprising hardware and/or software) for implementing the modules, as desired.

It will be understood in view of the above that the computing devices 902 of the network client devices, servers and network printer resources may be, for example, personal computers, personal digital assistants, mobile phones, network printers and servers, or combinations thereof. Further, it is recognised that each server-computing device 902, although depicted as a single computer system, may be implemented as a network of computer processors, as desired.

Further, it will be understood by a person skilled in the art that the memory/storage 918 described herein is the place where data can be held in a form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage 918 has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory 918 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage 918 can also be defined as an electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A method for releasing a print job to a printer resource in proximity to a mobile network terminal, the printer resource selected from a plurality of printer resources, the method comprising: obtaining location information of the mobile network terminal through a location service, wherein the location information is geographical coordinates; providing location information to a printer directory service; receiving connection and configuration information for a list of printer resources from the printer directory service, the list of printer resources being selected from the plurality of printer resources within a range limitation of the location information, wherein the configuration information comprises a release type accepted by each of the printer resources in the list of printer resources; and modifying a user interface of the mobile network terminal to accept authentication information required to release the print job to a printer resource in the list of printer resources within the range limitation of the mobile network terminal.

2. The method of claim 1, further comprising providing the authentication information to the printer resource.

3. The method of claim 1, wherein the configuration information comprises at least one type of authentication information accepted by the printer resource and wherein modifying the user interface further comprises modifying the user interface to accept the at least one type of authentication information.

4. The method of claim 1, wherein each of the printer resources from the plurality of printer resources has a corresponding release type selected from a plurality of release types, and wherein modifying the user interface further comprises modifying the user interface to accept the release type of a selected printer resource from the list of printer resources.

5. The method of claim 1, wherein the connection information is a network address.

6. The method of claim 5, wherein the network address corresponds to the printer resource.

7. A method of releasing a print job to a printer resource, the printer resource selected from a plurality of printer resources, the method comprising:
receiving location information, wherein the location information is geographical coordinates;
querying a database of printer resource information to identify one or more printer resources within a range limitation of the location information;
providing connection and configuration information from the database for the one or more printer resources located within the range limitation;
receiving authentication information associated with the print job; and
releasing the print job to one of the one or more printer resources if the authentication information is verified.

8. The method of claim 7, further comprising receiving a selection of at least one of the one or more printer resources.

9. The method of claim 7, wherein the configuration information comprises at least one type of authentication information accepted by the one of the one or more printer resources.

10. The method of claim 7, wherein each printer resource from the plurality of printer resources comprises a corresponding release type of a plurality of release types, and wherein the configuration information comprises a release type accepted by each of the one or more printer resources.

11. The method of claim 7, wherein the location information is network information and the database contains network information for printer resources.

12. The method of claim 7, wherein the connection information is a network address.

13. The method of claim 12, wherein the network address corresponds to the printer resource.

14. A mobile network terminal for releasing a print job from a nearby printer resource, the mobile network terminal comprising: a network interface; a memory for storing program code and data; a processor having access to the memory to execute program code, the processor configured to obtain location information of the mobile network terminal through a location service wherein the location information is geographical coordinates, provide location information to a printer directory service, receive connection and configuration information for a list of printer resources from the printer directory service, the list of printer resources being selected from the plurality of printer resources within a range limitation to the location information, wherein the configuration information comprises a release type accepted by each of the printer resources in the list of printer resources, and modify a user interface of the mobile network terminal to accept authentication information required to release the print job to a printer resource in the list of printer resources within the range limitation of the mobile network terminal.

15. A system for releasing a print job from a printer resource, the system comprising:
a database of printer resource information; and
one or more servers having a processor and memory for storing program code, the one or more servers connected through a communications network to the printer resource and the database, the processor when executing the program code is configured to receive location information, wherein the location information is geographical coordinates, query the database of printer resource information to identify one or more printer resources within a range limitation to the location information, provide connection and configuration information from the database for the one or more printer resources located within the range limitation, receive authentication information associated with the print job; and release the print job to one of the one or more printer resources if the authentication information is verified.

* * * * *